United States Patent [19]

Krinski et al.

[11] Patent Number: 4,554,337

[45] Date of Patent: Nov. 19, 1985

[54] MODIFIED PROTEIN ADHESIVE BINDER AND PROCESS FOR PRODUCING

[75] Inventors: Thomas L. Krinski, Granite City; Alan L. Steinmetz, Belleville, both of Ill.

[73] Assignee: Ralston Purina Company, St. Louis, Mo.

[21] Appl. No.: 692,732

[22] Filed: Jan. 18, 1985

[51] Int. Cl.[4] .......................... C08J 7/16; C08L 89/00; C09J 3/18

[52] U.S. Cl. .................... 527/201; 106/124; 106/154.1; 106/308 P; 260/112 R; 260/123.5

[58] Field of Search .................. 260/123.5, 112 R; 527/201; 106/124, 154 R, 308 P

[56] References Cited

U.S. PATENT DOCUMENTS

| | | | |
|---|---|---|---|
| 2,562,534 | 7/1951 | Coffman | 527/201 X |
| 2,763,625 | 9/1956 | Illingsworth et al. | 527/201 X |
| 2,862,918 | 12/1958 | Meyer et al. | 260/123.5 X |
| 2,932,589 | 4/1960 | Meyer et al. | 260/123.5 X |
| 2,933,406 | 4/1960 | Salzberg et al. | 106/154.1 X |
| 3,589,856 | 6/1971 | Wolfram | 527/201 X |
| 3,685,998 | 8/1972 | Miller | 527/201 X |
| 3,720,765 | 3/1973 | Miller | 260/123.5 X |
| 3,749,581 | 7/1973 | Sakita et al. | 260/123.5 X |
| 3,764,711 | 10/1973 | Melnychyn et al. | 260/112 R X |
| 3,842,062 | 10/1974 | Eastman | 260/123.5 X |
| 4,045,239 | 8/1977 | Hammer et al. | 527/201 X |
| 4,046,955 | 9/1977 | Bye | 106/124 X |
| 4,382,028 | 5/1983 | Paget | 260/112 B |
| 4,474,694 | 10/1984 | Coco et al. | 260/123.5 |

Primary Examiner—Howard E. Schain
Attorney, Agent, or Firm—Virgil B. Hill

[57] ABSTRACT

A modified vegetable protein adhesive binder and a process for producing the same is disclosed wherein an alkaline protein dispersion is formed of a vegetable protein material and said dispersion is treated with an alkyl acrylamidoglycolate alkyl ether in an amount sufficient to modify the protein material. The modified vegetable protein adhesive binder provides greater binder strength when employed in paper coating compositions containing pigment and other materials such as latex. The modified binder also results in coatings with good ink receptivity.

43 Claims, No Drawings

MODIFIED PROTEIN ADHESIVE BINDER AND PROCESS FOR PRODUCING

BACKGROUND OF THE INVENTION

This invention relates to a modified vegetable protein adhesive binder and a process for producing the same.

Vegetable protein materials are well known as adhesive binders for pigment containing coatings which are used for the coating of paper. Pigment containing coatings provide the paper with a desirable finish, gloss, and smoothness. The functions of the pigment in the coating are to fill in the irregularities of the paper surface and to produce an even and uniformly absorbent surface for printing. The adhesive binder functions to bind the pigment particles to each other as well as to the surface of the coating. The selection of a suitable adhesive is therefore an important factor in the quality of a coating applied to paper.

Vegetable protein materials have been extensively used as adhesive binders for paper coatings, and among those materials have been the vegetable protein isolates, typically soy isolate. Isolated soy protein is produced by the treatment of oil free soy bean flakes with an alkaline solution to dissolve the protein which is removed from the non soluble materials by filtration or centrifugation. The protein is then recovered from the solution by the addition of acid in order to precipitate the protein at its isoelectric point. The precipitated protein is then in an unhydrolyzed or generally unmodified state and can be dried and subsequently dispersed in an alkaline medium to form an adhesive binder for use in the preparation of pigment containing paper coating compositions. The unhydrolyzed or unmodified soy protein isolates are generally less desirable as adhesive binders for paper coatings because of relatively low solubility in weak alkaline solutions, high solution viscosity and sensitivity to heat, besides a tendency to form gels at temperatures of about 160° F. Because of these disadvantages, unmodified or non-hydrolyzed soy protein is usually modified in some way to lower the viscosity of coating compositions containing these materials as binders and furthermore to increase the adhesive strength of the protein when it is dispersed in weak alkaline solutions. Modification or hydrolysis of the protein also reduces the sensitivity of the protein to heat. Modification of the protein usually consists of hydrolysis or treatment of the extracted protein in an aqueous dispersion with various alkaline reagents under controlled conditions of pH, temperature and time. These conditions dissociate the native or unmodified protein structure into smaller subunits thereby improving the solubility of this material as a binder in paper coatings.

Another means of modifying the protein is to treat the unmodified protein with various chemical reagents in order to alter the rheological properties of coatings containing the modified protein material as a binder. Generally, the purpose of modifying the protein is to provide for increased fluidity of the protein material in alkaline dispersions and also much lower viscosity of coating compositions prepared with the modified protein material as a binder.

U.S. Pat. No. 2,862,918 describes such a modified protein wherein an isolated soy protein which has been hydrolyzed beyond the gel stage is acylated by treatment of the hydrolyzed soy protein material with a carboxylic acid anhydride, such as acetic anhydride. U.S. Pat. No. 2,932,589 describes a paper coating composition and process in which a modified soy protein material is produced by reaction of an isolate with a dicarboxylic acid anhydride, such as phthalic anhydride.

U.S. Pat. No. 4,474,694 also describes a modified vegetable protein adhesive binder and a process for producing the same in which an alkaline dispersion of a vegetable protein material is reacted initially with a reducing agent, followed by reaction with a carboxylic acid anhydride to modify the protein material and provide a coating with improved strength and ink receptivity.

In spite of the various improvements that have been obtained by chemical modification of vegetable protein material and the use of these materials in the preparation of paper coating compositions, it would still be desirable to obtain a modified protein material having improved rheological properties. This objective has been generally achieved in the present invention by the production of a modified vegetable protein material which is suitable as an adhesive binder in paper coating compositions containing pigments.

It is therefore an object of the present invention to provide a modified proteinaceous adhesive binder of good rheological properties.

It is a further object to provide a modified vegetable protein adhesive binder having good pigment binding and paper coating characteristics.

SUMMARY OF THE INVENTION

These and other objects are achieved in the present invention by the production of a modified vegetable protein adhesive binder having good rheological and paper coating characteristics. The present invention provides a process for the production of a modified vegetable protein adhesive binder which is suitable for use in pigment coating compositions wherein the process of producing the modified binder comprises forming an alkaline dispersion of a vegetable protein material followed by reaction of the dispersion with an alkyl acrylamidoglycolate alkyl ether in an amount sufficient to modify the protein material. Modification of the protein material with the ether apparently cross links the vegetable protein material since the acrylamidoglycolate alkyl ether has a number of reactive sites which can provide a cross linking means for the various amide or amino groups which are present in the vegetable protein material. The vegetable protein material modified with the acrylamidoglycolate ether provides an adhesive binder in paper coating compositions in which a significant improvement is achieved in coating strength. The coating composition with the modified binder also has excellent ink receptivity. The use of the acrylamidoglycolate ether for modification of the vegetable protein material pursuant to the present invention provides a unique modified vegetable protein material having improved characteristics in pigment containing paper coating compositions prepared therewith.

DESCRIPTION OF THE PREFERRED EMBODIMENTS

The present invention applies to a modified protein material suitable as an adhesive binder in paper coating compositions. More specifically the present invention pertains to a vegetable protein material, such as a vegetable protein isolate and most preferably to a soy isolate. A soy isolate is the most commonly produced protein isolate derived from vegetable plant sources. The present invention is therefore described with respect to a soy isolate since this is the primary area of concern for which the present invention was developed, although it is apparent that other vegetable protein materials can be employed and modified in a similar manner if desired. For purposes of explanation in the context of the present invention, an isolated soy protein material is initially prepared by treatment of defatted soy bean flakes with an alkaline solution to solubilize the protein. The protein extract is then separated from the alkali insoluble solids by filtration or centrifugation. This protein extract or dispersion is typically used as the starting material in the process of the present invention. The extract or dispersion of the globular protein from the soy flakes will typically have a pH between 9.5 and 11.2. Using the protein extract from the isolate process is a preferred way of using an isolate in the preparation of the modified soy protein material of the present invention, since the extract itself has the protein already contained in an alkaline aqueous dispersion. However, it is equally apparent that a dried protein isolate which has been previously isolated from the soy flakes and dried may be used as the starting material wherein an alkaline dispersion of the dried protein material is formed for purposes of carrying out the chemical modification of the protein material pursuant to the present invention. Furthermore, the particular type of alkaline material that may be used to disperse the protein material or provide the alkaline extract of the soy bean flakes is not critical to the practice of the present invention, and in fact, any type of alkali or alkaline earth hydroxide or salts thereof, may be readily and conveniently employed in preparation of the protein dispersion.

Typically, an alkaline dispersion of the vegetable protein material is formed to provide a dispersion having a proteinaceous solids level of at least about 2% by weight, typically 2 to 20% by weight, and preferably about 3 to 12% by weight. A most preferred level of proteinaceous solids in the dispersion is about 10% by weight. Furthermore, it is preferred that the dispersion have a pH of about 8 to 12, and preferably about 9 to 11. A most preferred pH for the alkaline dispersion for purposes of chemical modification of the protein is a pH of about 10.

The dispersion of protein material is then reacted with an alkyl acrylamidoglycolate alkyl ether in an amount sufficient to modify the protein material. The preferred reaction conditions for purposes of modifying the protein material include a temperature of about 20° to 60° C., and preferably 40° to 50° C., as well as a maintenance of a pH of about 9 to 10 during modification of the protein. The exact temperature and time of reaction or modification of the protein is not critical to the present invention, and because of the general relationship between time and temperature, relatively longer times of reaction would be required when low temperatures are employed, whereas relatively short reaction times would be required when somewhat higher temperatures are employed. The temperature for reaction or modification of the protein is limited only by the fact that if too high a temperature is employed it may adversely affect the coating characteristics of the protein material, and it is preferred that temperature of reaction not exceed 70° C., and most preferably be maintained below 60° C. A typical amount of alkyl acrylamidoglycolate alkyl ether is a level of about 2.5–10% by weight of the protein solids, and preferably about 2.5–5.0% by weight of the protein solids.

Although the exact alkyl acrylamidoglycolate alkyl ether employed in modification of the protein pursuant to the present invention is not critical to its practice, nevertheless it is preferred for purposes of the present invention that a methyl acrylamidoglycolate methyl ether be employed as the reactant for modification of the protein. Various other alkyl acrylamidoglycolate alkyl ethers are also suitable for modification of the protein, as well as mixtures thereof. Typical other alkyl acrylamidoglycolate alkyl ethers that are available include butyl acrylamidoglycolate methyl ether, methyl acrylamidoglycolate butyl ether, and butyl acrylamidoglycolate butyl ether. The modified protein materials produced with these reagents provide a modified protein having a degree of cross linking which significantly improves the strength of paper coating compositions employed with these modified materials as binders.

Following modification of the protein material with the alkyl acrylamidolglycolate alkyl ether, the modified protein material can be isolated by acid precipitation at the isoelectric point of the protein which is typically at a pH of about 4 to 5, and otherwise recovered by washing, filtering, pressing, or dewatering and drying of the product. Alternatively, the modified protein material can be spray-dried in the form of the alkaline dispersion without isoelectric precipitation if desired to provide a dried modified protein material also suitable for use in the preparation of pigment containing coating compositions.

Although the present invention has not intended to be limited by the exact types of coating compositions in which the modified protein adhesive binder of the present invention may be employed, nevertheless typical coating compositions which employ the modified protein adhesive binder of the present invention generally include ingredients such as pigments, fluidizers or thinning agents, as well as various other ingredients such as optical brighteners and co-binders such as acrylic or styrene-butadiene latexes. Typically the modified vegetable protein adhesive binder of the present invention is dispersed in a solubilizing agent such as an alkaline material, typically sodium carbonate, ammonium hydroxide, sodium hydroxide and the like. These materials provide a conventional means of solubilizing various types of protein materials for use as adhesive binders in paper coating compositions. The exact amount of protein isolate used to prepare the binder solution is at a level sufficient to form an adhesive binder for the pigment coating and typically of a sufficient level so when the coating composition with the mineral pigment is prepared about 1 to 10% by weight of the coating comprises binder.

It may be desirable to further employ fluidizers or thinning agents in the preparation of the protein binder solution. This will improve the ultimate viscosity of coating compositions which are prepared with the protein binder solution. Typical fluidizers include materials such as dicyandiamide, ammonium nitrate, or urea. These agents may be employed in the preparation of the binder solution of the present invention and are added in amounts of between about 5 to 20%, preferably 5 to 10% by weight of the protein used to prepare the binder.

Following the formation of the protein binder solution, it is mixed with a mineral pigment in an amount sufficient to provide a slurry typically having a solids content of at least about 36% by weight, and typically between about 38 and 44% by weight of such slurry. The exact amount of pigment which may be employed in the present invention is not critical since a variety of levels may be suitable depending upon the exact coating characteristics desired. It is therefore typical to employ the pigment in an amount sufficient to provide a uniform coating on the substrate; the exact amount is not critical to the practice of the present invention. Furthermore, the exact type of pigment which may be employed is not critical and a variety of mineral pigments commonly used in the preparation of paper coatings, such as clay, calcium carbonate, titanium dioxide, and the like, are suitable.

Following dispersion of the mineral pigment with the proteinaceous adhesive binder solution, various other ingredients are added; such materials typically include co-binders such as the various latexes, preferably acrylic or styrene-butadiene latexes, which further improve the coating characteristics of the composition. The exact components of the coating composition with which the modified binder of the present invention may be employed is not critical to its practice since these represent a variety of materials all of which are well known to those skilled in the art.

The following examples represent specific but non-limiting embodiments of the present invention.

EXAMPLE 1

200 pounds of solvent extracted soybean flakes were extracted with 2,000 pounds of water at 90° F. to which was added 2.5% by weight of the flakes of calcium hydroxide. The soybean flakes were extracted for 30 minutes with the alkaline solution in order to solubilize the protein and the alkaline insoluble solids were then removed by centrifugation. The alkaline insoluble solids or extracted flakes were then re-extracted with an additional 1000 pounds of water which had been preheated to a temperature of 105° F. in order to solubilize additional protein in the extracted flakes. Following extraction, the insoluble solids or extracted flakes were again removed from the extract by centrifugation. The two alkali protein extracts were combined to provide an alkaline extract or dispersion having a protein content of 3.0% by weight, a total solids level of 5% by weight, and a pH of 10.6. The alkaline extract was maintained at 50° C. and the pH adjusted to 10 by the addition of sulfuric acid.

Three separate portions of the alkaline extract at a pH of 10 and a temperature of 50° C. were reacted with three different levels of methyl acrylamidoglycolate methyl ether 2.5%, 5% and 10% by weight of the proteinaceous solids level in the extract. Each extract containing the specific amount of ether was stirred at a temperature of 50° C. for a period of 1 hour. Following reaction or modification of the protein the pH of each extract was adjusted to 4.5 by the addition of sulfuric acid in order to precipitate the protein. The precipitated protein was concentrated by centrifugation, washed twice with water, and air dried.

EXAMPLE 2

An aqueous dispersion of a dried soy protein isolate was formed at a proteinaceous solids level of 10% by weight. The pH of the dispersion was adjusted to 10.0 by the addition of a 50% solution of sodium hydroxide. The temperature of the dispersion was heated to 50° C., followed by the addition of 5% by weight of the protein solids of methyl acrylamidoglycolate methyl ether. The dispersion containing the ether was maintained at 50° C. and stirred for a period of one hour. Following modification of the protein, the pH of the dispersion was adjusted to the isoelectric point, about 4.5, by the addition of sulfuric acid. The addition of acid resulted in precipitation of the protein which was concentrated by centrifugation, washed twice with water and air dried.

EXAMPLE 3

The modified protein binder produced in Example 2 was evaluated as an adhesive binder in a pigment containing paper coating composition and compared to a non-modified soy isolate which was also used a binder in a similar coating composition.

An alkaline dispersion of the modified protein of Example 2 and the non-modified isolate were prepared by dispersing both proteins at a solids level of 13.5% by weight in a 0.3 molar ammonium hydroxide solution.

Two separate paper coating compositions were prepared having a total solids level of 47.4% by weight in which the coating contained 100 parts by weight of clay, 10 parts by weight of a styrene-butadiene latex and 5 parts by weight of either the modified protein isolate of Example 2 or an unmodified protein isolate as the binder. The rheological properties of both coatings were evaluated as listed in Table 1. The two coating compositions containing the different binders were then applied to paper with a draw down bar. The coated paper was evaluated for gloss, IGT value, and ink receptivity. The IGT value measures the force the coating will withstand with certain types of ink used in printing. The ink receptivity is measured by the percentage drop for K&N ink. The smaller the number for ink receptivity, the more non-porous the coating is and therefore a lesser degree of ink penetration into the coating. These various methods for evaluating the coatng are standard methods of measurement published by the *Tehcnical Association of Pulp and Paper Industries* (TAPPI). The results of the testing are set forth in Table 2.

TABLE 1

| | Coating Viscosity (CPS) with Modified Protein Isolate of Example 2 and Unmodified Isolate as Binder at 25° C. | |
|---|---|---|
| RVT Speed | Modified Protein Isolate | Unmodified Protein Isolate |
| 10 RPM | 2400 | 2500 |
| 20 RPM | 1425 | 1475 |
| 50 RPM | 720 | 720 |
| 100 RPM | 440 | 440 |
| S. D. Warren Water Retention | | |
| SEC | 13.7 | 9.5 |

TABLE 2

| | Coating Evaluation using Modified Protein of Example 2 and Unmodified Protein Isolate as Binders | |
|---|---|---|
| | Coating with Unmodified Protein Isolate as a Binder (Calendered 3 nips) | Coating with Modified Protein Isolate of Example 2 as Binder (Calendered 3 nips) |
| Coatweight (gm/m$^2$) | 16.3 | 16.0 |
| Opacity (%) | 88.0 | 87.8 |
| 75° Gloss (%) | 79.1 | 79.7 |
| Brightness | 76.6 | 75.7 |
| K & N Ink Receptivity | 9.6 | 8.0 |

TABLE 2-continued

Coating Evaluation
using Modified Protein of Example 2 and
Unmodified Protein Isolate as Binders

|  | Coating with Unmodified Protein Isolate as a Binder (Calendered 3 nips) | Coating with Modified Protein Isolate of Example 2 as Binder (Calendered 3 nips) |
|---|---|---|
| (% drop) |  |  |
| IGT |  |  |
| Ink | IP15 | IP15 |
| Velocity (cm/sec) | 170 | 204 |
| Coating Lift Off |  |  |
| Speed/Pressure | M/50 | M/50 |
| Wet Rub Resistance (% T) | 91.8 | 92.4 |

It is apparent from an examination of the above data that the two coatings had comparable rheological properties and the modified protein material when used as an adhesive binder resulted in a coating having greater binder strength, as shown by the greater pick strength of 204 cm/sec. Furthermore, the coating with the modified binder had slightly better ink receptivity and was comparable to the unmodified protein binder in terms of optical properties.

EXAMPLE 4

Three separate binder solutions or alkaline dispersions of protein were prepared using the three modified protein isolate materials produced in Example 1. A separate binder solution of an unmodified protein isolate was also prepared as a control. The binder solutions were prepared by dispersing the protein at a solids level of 13.5% by weight in a 0.3 molar solution of ammonium hydroxide.

Coating compositions were then prepared with each binder solution including the control, with each composition having a total solids level of 47.4% by weight. The coating comprised 100 parts by weight of clay, 10 parts by weight of a styrene butadiene latex and 5 parts by weight of each protein dispersion. The rheological properties of all of the coatings were evaluated as listed in Table 3. The coatings were then applied to paper with a draw down bar and evaluated as described in Example 3.

TABLE 3

Coating Viscosity (CPS) using Binder Produced with Various Levels of Modifying Agent and an Unmodified Protein Binder as a Control at 25° C.

| Level of Modifying Agent (% by weight of Protein Solids) | 0% (Control) | 2.5% | 5.0% | 10.0% |
|---|---|---|---|---|
| RVT Viscosity |  |  |  |  |
| 10 RPM | 2525 | 1625 | 2075 | 3650 |
| 20 RPM | 1475 | 1013 | 1213 | 2375 |
| 50 RPM | 730 | 540 | 590 | 1240 |
| 100 RPM | 440 | 350 | 360 | 770 |
| S. D. Warren Water Retention |  |  |  |  |
| SEC | 11.6 | 17.3 | 21.2 | 17.4 |

An examination of the rheological properties of the various coatings in Table 3 indicates the coatings containing the modified protein varied little as compared to the control except that the viscosity of the coating prepared with the modified protein prepared with 10% by weight of modifying agent had a somewhat higher viscosity.

TABLE 4

Coating Evaluation Using Various Modified Protein Binders and Unmodified Protein Binder

| Level of Modifying Agent (% by weight of Protein Solids) (Calendered 3 nips) | 0% | 2.5% | 5.0% | 10.0% |
|---|---|---|---|---|
| Coatweight (gm/m$^2$) | 14.9 | 14.9 | 14.3 | 14.9 |
| Opacity (%) | 88.8 | 88.7 | 88.4 | 88.5 |
| 75° Gloss (%) | 77.2 | 77.2 | 77.1 | 74.6 |
| Brightness | 78.3 | 77.8 | 78.1 | 77.1 |
| K & N Ink Receptivity (% drop) | 23.0 | 21.8 | 21.0 | 16.1 |
| IGT |  |  |  |  |
| Ink | 6 | 6 | 6 | 6 |
| Velocity (cm/sec) | 160* | 193* | 188 | 184* |
| Coating Lift Off |  |  |  |  |
| Speed/Pressure | M/50 | M/50 | M/50 | M/50 |
| Wet Rub Resistance (% T) | 95.0 | 91.3 | 93.1 | 93.2 |

*Fiber Tear

An examination of the data from the coating evaluation in Table 4 clearly indicated that coatings containing the modified protein had greater strength as evidenced by the higher pick strength values between 188–193 cm/sec and compared to 160 cm/sec for the control binder. The modified protein binder coatings were generally equivalent to the control insofar as optical properties except where 10% of the modifying agent was used; this coating was lower in gloss but was less ink receptive.

While the present invention has been described with regard to the specific embodiments set forth above, it should be understood that it is intended to include within the scope of the present invention all equivalents thereto.

What is claimed is:

1. A process for the production of a modified vegetable protein adhesive binder comprising:
   (a) forming an alkaline dispersion of a vegetable protein material;
   (b) treating said dispersion with an alkyl acrylamidoglycolate alkyl ether in an amount sufficient to modify the protein material.

2. The process of claim 1 wherein said vegetable protein material is a vegetable protein isolate.

3. The process of claim 1 wherein said dispersion has a proteinaceous solids level of at least about 2% by weight.

4. The process of claim 3 wherein said dispersion has a proteinaceous solids level of 2 to 20% by weight.

5. The process of claim 4 wherein said dispersion has a proteins solids level of about 3 to 12% by weight.

6. The process of claim 1 wherein said dispersion has a pH of about 8 to 12.

7. The process of claim 6 wherein said dispersion has a pH of about 9 to 11.

8. The process of claim 7 wherein said dispersion has a pH of about 10.

9. The process of claim 1 wherein said dispersion has a temperature of about 20° to 60° C.

10. The process of claim 1 wherein the amount of alkyl acrylamidoglycolate alkyl ether is about 2.5–10% by weight of the protein solids.

11. The process of claim 10 wherein the amount of alkyl acrylamidoglycolate alkyl ether is about 2.5–5% by weight of the protein solids.

12. The process of claim 1 wherein the alkyl group is selected from the groups consisting of methyl and butyl.

13. The process of claim 1 wherein the vegetable protein material is a soy protein isolate.

14. The process of claim 1 including the step of adjusting the pH of the treated dispersion to the isoelectric point to precipitate the modified protein material.

15. The process of claim 1 including the step of dewatering the modified protein material.

16. A process for the production of modified vegetable protein adhesive binder comprising:
   (a) forming an alkaline dispersion of a vegetable protein material having a proteinaceous solids level of at least about 2% by weight, and
   (b) treating said dispersion with an alkyl acrylamidoglycolate alkyl ether in an amount sufficient to modify the protein material.

17. The process of claim 16 wherein said vegetable protein material is a vegetable protein isolate.

18. The process of claim 16 wherein said dispersion has a solids level of about 2 to 20% by weight.

19. The process of claim 16 wherein said dispersion has a proteinaceous solids level of 3 to 12% by weight.

20. The process of claim 16 wherein said dispersion has a pH of about 8 to 12.

21. The process of claim 20 wherein said dispersion has a pH of about 9 to 11.

22. The process of claim 20 wherein said dispersion was a pH of about 10.

23. The process of claim 16 wherein said dispersion has a temperature of about 20° to 60° C.

24. The process of claim 16 wherein the amount of alkyl acrylamidoglycolate alkyl ether is about 2.5–10% by weight of the proteinaceous solids.

25. The process of claim 20 wherein the amount of alkyl acrylamidoglycolate alkyl ether is about 2.5–5% by weight of the proteinaceous solids.

26. The process of claim 16 wherein the alkyl group is selected from the group consisting of methyl and butyl.

27. The process of claim 16 wherein the vegetable protein material is a soy protein isolate.

28. The process of claim 16 including the step of adjusting the pH of the treated dispersion to the isoelectric point to precipitate the modified protein material.

29. The process of claim 16 including the step of dewatering the modified protein material.

30. A process for the production of modified vegetable protein adhesive binder comprising:
   (a) forming an alkaline dispersion of a vegetable protein material having a proteinaceous solids level of about 2 to 20% by weight.
   (b) treating said dispersion with a methyl acrylamidoglycolate methyl ether in an amount sufficient to modify the protein material.

31. The process of claim 30 wherein said vegetable protein material is a vegetable protein isolate.

32. The process of claim 30 wherein said dispersion has a proteinaceous solids level of 3 to 12% by weight.

33. The process of claim 30 wherein said dispersion has a pH of about 8 to 12.

34. The process of claim 33 wherein said dispersion has a pH of about 9 to 11.

35. The process of claim 30 wherein said dispersion has a temperature of about 20° to 60° C.

36. The process of claim 30 wherein the amount of methyl acrylamidoglycolate methyl ether is about 2.5–10% by weight of the proteinaceous solids.

37. The process of claim 36 wherein the amount of methyl acrylamidoglycolate methyl ether is about 2.5–5% by weight of the proteinaceous solids.

38. The process of claim 30 wherein the vegetable protein material is a soy protein isolate.

39. The process of claim 30 including the step of adjusting the pH of the treated dispersion to the isoelectric point to precipitate the modified protein material.

40. The process of claim 30 including the step of dewatering the modified protein material.

41. The product produced by the process of claim 1.

42. The product produced by the process of claim 16.

43. The product produced by the process of claim 30.

* * * * *